US007224365B1

(12) United States Patent  
Seideman et al.

(10) Patent No.: US 7,224,365 B1  
(45) Date of Patent: May 29, 2007

(54) SYSTEM AND METHOD FOR TRANSFERRING THEMATIC INFORMATION OVER THE INTERNET

(75) Inventors: Michael Howard Seideman, Larkspur, CA (US); Geoffrey Thomas Gates, Larkspur, CA (US); Jon Floyd Eberly, San Francisco, CA (US); Thomas Philip Zito, Carrboro, NC (US)

(73) Assignee: Totally Global, Inc., San Rafael, CA (US)

( * ) Notice: Subject to any disclaimer, the term of this patent is extended or adjusted under 35 U.S.C. 154(b) by 977 days.

(21) Appl. No.: 09/816,615

(22) Filed: Mar. 23, 2001

(51) Int. Cl.  
*G06T 15/00* (2006.01)

(52) U.S. Cl. .................. 345/473; 715/716; 715/764; 386/125

(58) Field of Classification Search ............. 345/473, 345/474, 475; 702/3, 5; 715/716, 738, 764, 715/769, 801, 838, 839; 386/83, 95, 125  
See application file for complete search history.

(56) References Cited

U.S. PATENT DOCUMENTS

| | | | | |
|---|---|---|---|---|
| 5,848,373 | A * | 12/1998 | DeLorme et al. ........... | 701/200 |
| 6,344,861 | B1 * | 2/2002 | Naughton et al. .......... | 715/769 |
| 6,714,215 | B1 * | 3/2004 | Flora et al. ................. | 715/716 |
| 6,845,324 | B2 * | 1/2005 | Smith ........................... | 702/3 |
| 6,868,225 | B1 * | 3/2005 | Brown et al. ................ | 386/83 |
| 6,986,107 | B2 * | 1/2006 | Hanggie et al. ............ | 715/815 |

* cited by examiner

*Primary Examiner*—Phu K. Nguyen  
(74) *Attorney, Agent, or Firm*—Dorsey & Whitney LLP

(57) ABSTRACT

System and method for transferring thematic information over the Internet in which graphical representations for different themes are created in a vector format, the vector graphics are imported into the frames of an animation movie, the frames of the movie are downloaded from the server to the client, and the frames are selectively overlaid to display different themes. The movie comprises a menu and a plurality of overlays that can be accessed by selecting topics on the menu. The menu file is downloaded first, and then data files for the overlays are downloaded in sequence. If the client selects a topic before the data file associated with it has been downloaded, the download is interrupted, and the data file for the selected topic is downloaded immediately.

The amount of data that must be downloaded for thematic maps is minimized by downloading the outline of the region as a separate frame or overlay, and using that overlay with the overlays for a number of different themes. Where the maps include colored areas, the amount of data which must be downloaded is further reduced by extending the colored areas beyond the boundaries of the map to a simple polygon, then using the outline as a mask to display only the portions of the colored areas within the boundaries.

Some maps include icons which represent links to locations on the Internet which have video clips with information relating the areas where the icons are displayed. When those icons are selected, the video clips are downloaded and played.

28 Claims, 13 Drawing Sheets

Main Program

The Default Load Sequence Thread

The LoadData Subroutine

The ShowData Thread

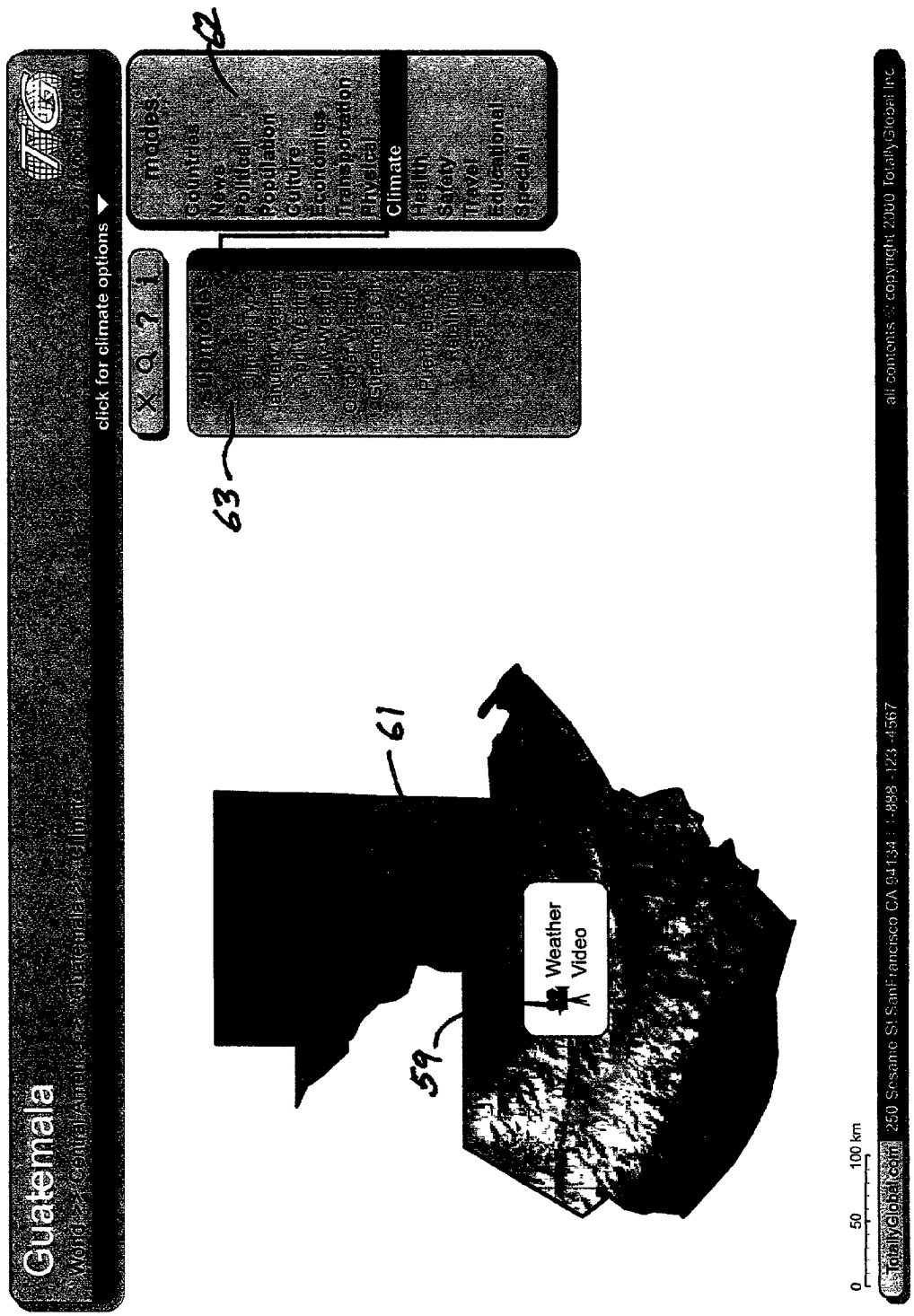

SYSTEM AND METHOD FOR TRANSFERRING THEMATIC INFORMATION OVER THE INTERNET

This invention pertains generally to the transfer of information over the Internet and, more particularly, to a system and method for transferring information of a thematic nature.

Heretofore, maps and other spatially related thematic information have been transmitted over the Internet in a bit-map format. That is an inherently slow process due to the need to transmit data for every point in a map or image. The long download times cause long delays in the display of different images and prevent rapid transition between different maps or themes.

It is in general an object of the invention to provide a new and improved system and method for transferring thematic information over the Internet.

Another object of the invention is to provide a system and method of the above character which are particularly suitable for use in delivering thematic maps over the Internet.

Another object of the invention is to provide a system and method of the above character in which thematic information is transferred and displayed more rapidly than in the prior art.

These and other objects are achieved in accordance with the invention by providing a system and method for transferring thematic information over the Internet in which graphics for different themes are created in a vector format, the vector graphics are imported into the frames of an animation movie, the frames of the movie are downloaded from the server to the client, and the frames are selectively overlaid to display different themes.

The movie comprises a menu and a plurality of overlays that can be accessed by selecting topics on the menu. The menu file is downloaded first, and then data files for the overlays are downloaded in sequence. If the client selects a topic before the data file associated with it has been downloaded, the download is interrupted, and the data file for the selected topic is downloaded immediately.

In some embodiments, thematic maps including an outline of a region and areas of different colors within the outline are created in a vector format. The outline is imported into one frame of an animation movie, and to reduce the amount of data which must be downloaded, a color-coded frame is prepared by drawing a polygon around one of the maps, drawing a straight line between each color transition along the outline and the polygon, erasing the outline and filling in the areas between the straight lines with the colors from the areas of the map between those lines. The color-coded frame is displayed in a layer beneath a layer containing the outline, with the layer containing the outline masking off the colored areas outside the outline so that the map is displayed as comprising the areas of different colors in the shape of the region. If desired, another layer containing the outline can be included in the display so that a visible border line will appear around the region. The same outline frame can be used with color-coded frames for a number of different themes.

In yet another aspect of the invention, a thematic map of a geographic area is created with an icon displayed thereon representing a link to a location on the Internet from which a video clip containing information relating to the area can be downloaded. The data for the map is downloaded from the server to the client, the map is displayed with the icon, utilizing the data that has been downloaded, and the video clip is downloaded and played upon selection of the icon.

FIGS. 16 and 17 illustrate thematic maps with icons representing links to video clips in accordance with the invention.

Although the invention can be employed for many different types of spatially related thematic information, it is particularly suitable for use in the delivery of thematic maps over the Internet, and it is therefore described primarily in that context.

Thematic maps are maps of a region such as the world, a continent, a country, a city or other type of location, with information about the region superimposed on the map. The information can encompass a wide variety of different themes such as news, politics, population, culture, economics, transportation, geographical features, climate, health, safety, travel and points of interest. One map usually has information for only one theme, and a number of different maps are provided for each region.

The thematic maps are created in a vector format, using software such as Macromedia Freehand or Adobe Illustrator. In order to keep file size and download time to a minimum, the only points that are included are the ones that are necessary for the specific theme.

After creation, the vector maps are imported and integrated into the frames of an animation movie, utilizing software such as Macromedia Flash and Action Script. Each theme is, in effect, one frame of the movie. The animation movie allows the vector format to be maintained even when the information is sent over the Internet. That represents a significant improvement over prior art systems in which maps were converted to a bitmap format (e.g., gif or jpeg) when they were imported into the Internet Web format. The only software an end user or client needs in order to view the maps is a standard Web browser such as Internet Explorer or Netscape Navigator and a movie reader such as the Macromedia Flash plug-in.

Figure 1:
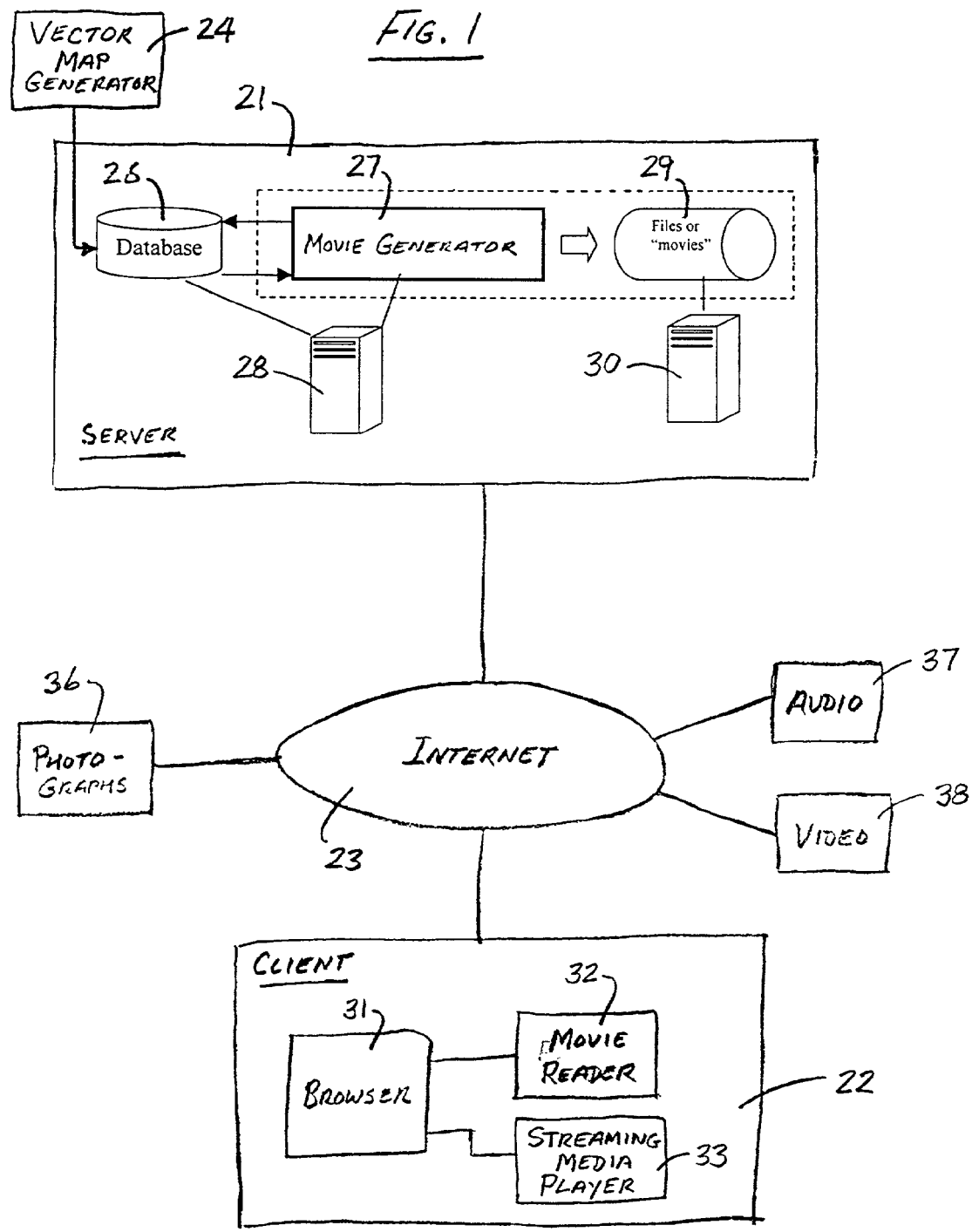
FIG. 1 is a block diagram of one embodiment of a system for transferring thematic information in accordance with the invention.

As illustrated in FIG. 1, a typical system for transferring thematic information in accordance with the invention includes a server 21 and a client 22, which communicate with each other through an Internet connection 23. Vector maps are created by a cartographer using programs such a Macromedia Freehand or Adobe Illustrator, represented by a vector map generator 24 in FIG. 1. They are then optimized using a program such as Macromedia Flash, and transferred to the server where they are stored in a database 26. That database preferably supports the Java Database Connectivity (JDBC) and/or Open Database Connectivity (ODBC) protocols, and can be accessed and updated via an application programming interface (API) based on a standard interface such as the JDBC interface. One presently preferred database is the Oracle 8i database.

In addition to the vector maps, frequently updated fields, such as transportation alerts and weather warnings, as well as less active data, such as country populations and names, and sponsor information are also stored in the database, along with other vector graphics such as pie charts, tables, and scatter charts.

The server includes an animation movie generator 27 such as Macromedia Generator which functions in connection with a computer 28 to import the vector maps into the frames of an animation movie. The data for those frames is stored in files 29 which are served over the Internet by a Web server 30 running software such the iPlanet Web server. Macromedia Generator uses templates or SWT's which contain placeholders for portions of animation movies. Through the use of a custom program, graphics are then generated so the end-user can view the changes. This enables people without special technical training to update the movies.

When the data files are received by the client, they are rendered by the requesting browser and the appropriate plug-in, applet or active-x control. In the embodiment illustrated in FIG. 1, the client 22 includes a browser 31, a movie player 32 such as the Flash plug-in, and a streaming media player 33.

Non-vector media such as photographs, audio clips and video clips are also stored on other servers 36, 37, 38 on the Internet.

The process by which the movies are delivered from the server to the client is designed to minimize the end user's wait time when he accesses the server. A movie consists of a menu bar and a series of overlays or frames that can be accessed through the menu bar. The menu bar contains a number of themes or topics, and for each topic there may be one or more subtopics that can be selected.

The movie is delivered in a main menu file and one or more data files. When the client accesses the server, the main menu file is delivered first and becomes active as soon as delivery is complete. The data files contain data that is displayed in response to the user's selection of a specific topic in the main menu or in a submenu.

The data files are downloaded in a predetermined sequence, with only one data file being downloaded at a time. If the user selects a subtopic whose overlay is contained in a data file that has not loaded yet, that data file begins to load immediately. if another data file was loading at the time, the program stops loading it so that the new data file can be delivered as quickly as possible.

In one presently preferred embodiment, the file loading process is implemented within the menu file using Action Script, a programming language that runs inside Flash movies. The Action Script program runs on the end user's machine and controls the delivery of the data files.

When the menu file is delivered, it runs a main program that runs other programs called subroutines and threads. When the main program calls a subroutine, it stops whatever else it is doing, calls the subroutine, and waits for the subroutine to return. The main program then resumes where it left off. When the main program starts a thread, the main program continues running and takes turns with the thread until the thread ends.

Figure 2:
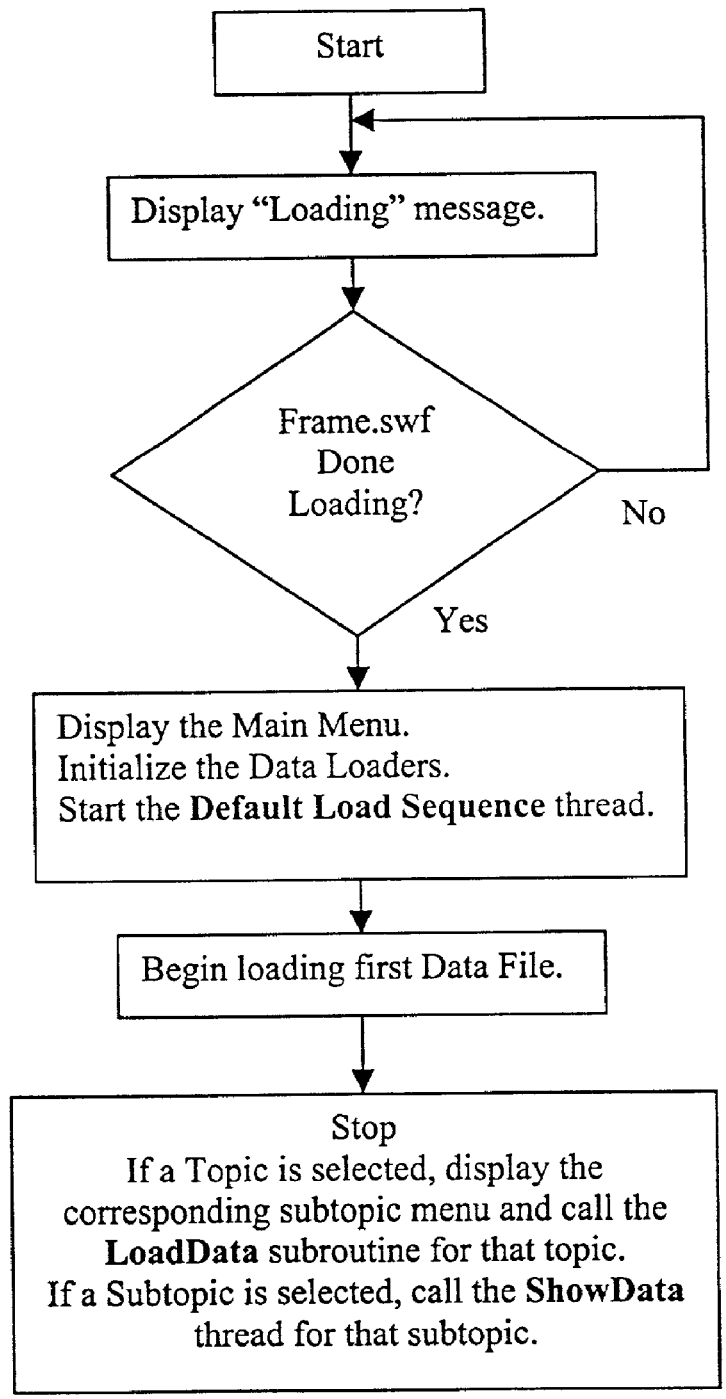
FIGS. 2–5 are flow charts of one embodiment of a program for transferring thematic information between a server and a client in accordance with the invention.
Figure 3:
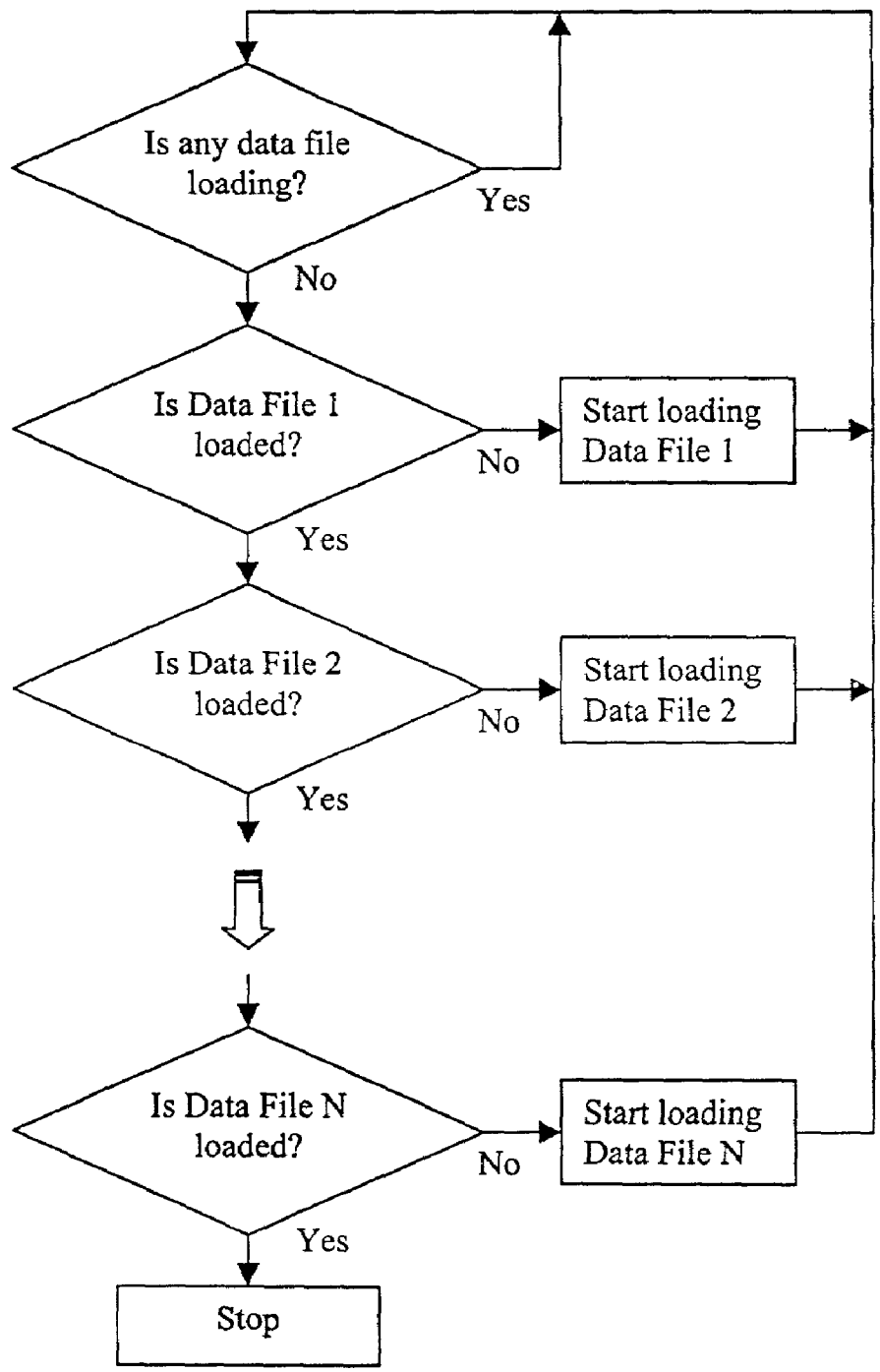

The main program is illustrated in FIG. 2. When the program is started, it displays a "Loading" message and checks to see if the menu file (Frame.swf) is done loading. Once that file has been downloaded, the main menu is displayed, the data loaders are initialized, and the Default Load Sequence thread illustrated in FIG. 3 is started.

The Default Load Sequence thread first checks to see if any data file is loading. If one is loading, it continues to load, and the thread keeps checking until no data file is loading. If no data file is loading, the thread then checks sequentially to see if the data files have been loaded. When it comes to a data file that has not been loaded, it starts loading it and checks to see when it is done loading. This process continues until all of the data files have been downloaded.

Figure 4:
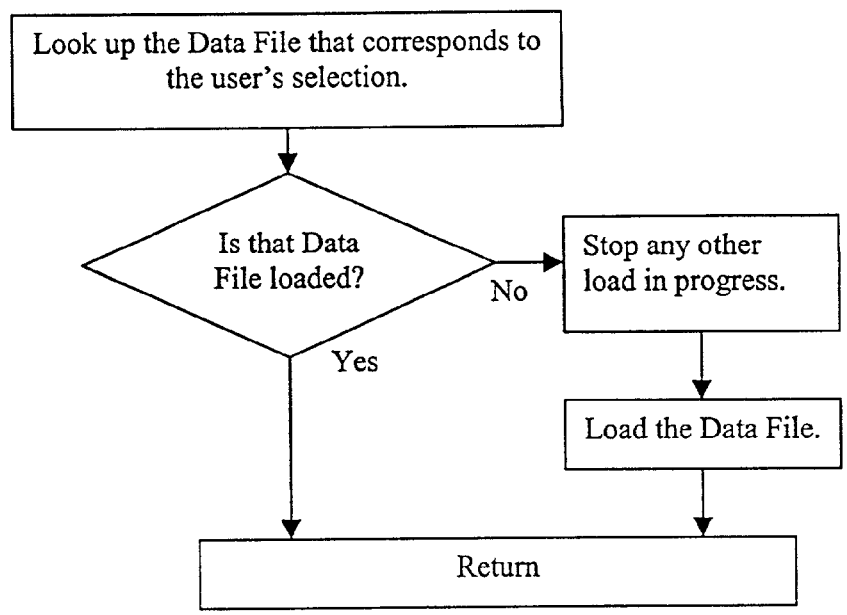

During the loading process, the main program checks to see if a topic has been selected from the main menu by the client. When a topic is selected, the program jumps to the LoadData subroutine illustrated in FIG. 4. That subroutine looks up the data file that corresponds to the selected topic and checks to see if that file has been loaded. If so, it returns to the main program. If, however, that data file has not been loaded, the subroutine interrupts any other load which may be in progress and immediately starts loading the data file for the selected topic. Once that file has been loaded, the program returns to the main program.

Figure 5:
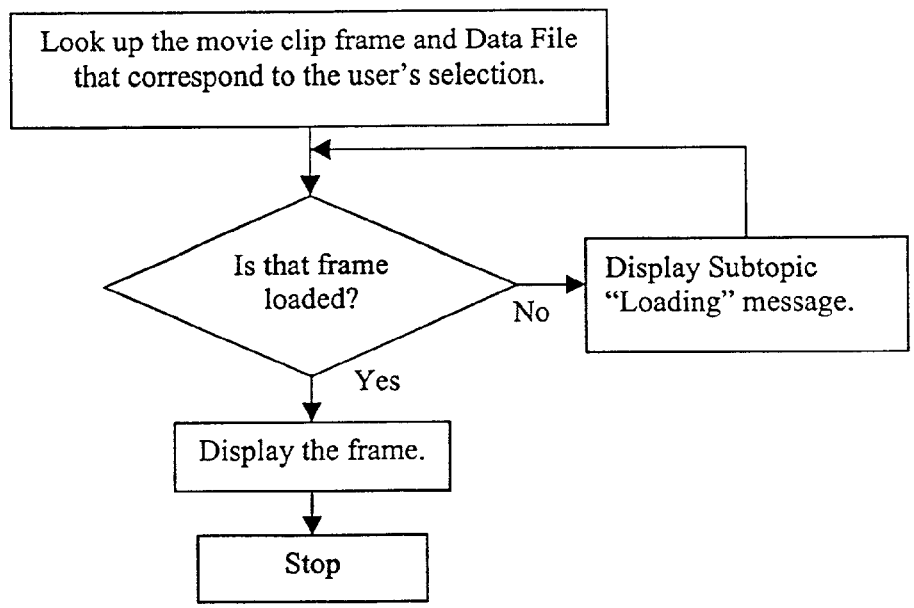

The selected topic may include a subtopic menu, and once the data file for the topic has been downloaded, the program checks to see if a subtopic has been selected. If a subtopic has been selected, the ShowData thread illustrated in FIG. 5 is started.

The ShowData thread looks up the movie clip frame and data file that correspond to the selected subtopic, and checks to see if that data file has been loaded. If that file has been loaded, the frame is displayed, and the thread stops. If not, a "Loading" message is displayed, the thread continues checking until the file has been loaded, and the frame is displayed.

Figure 6:
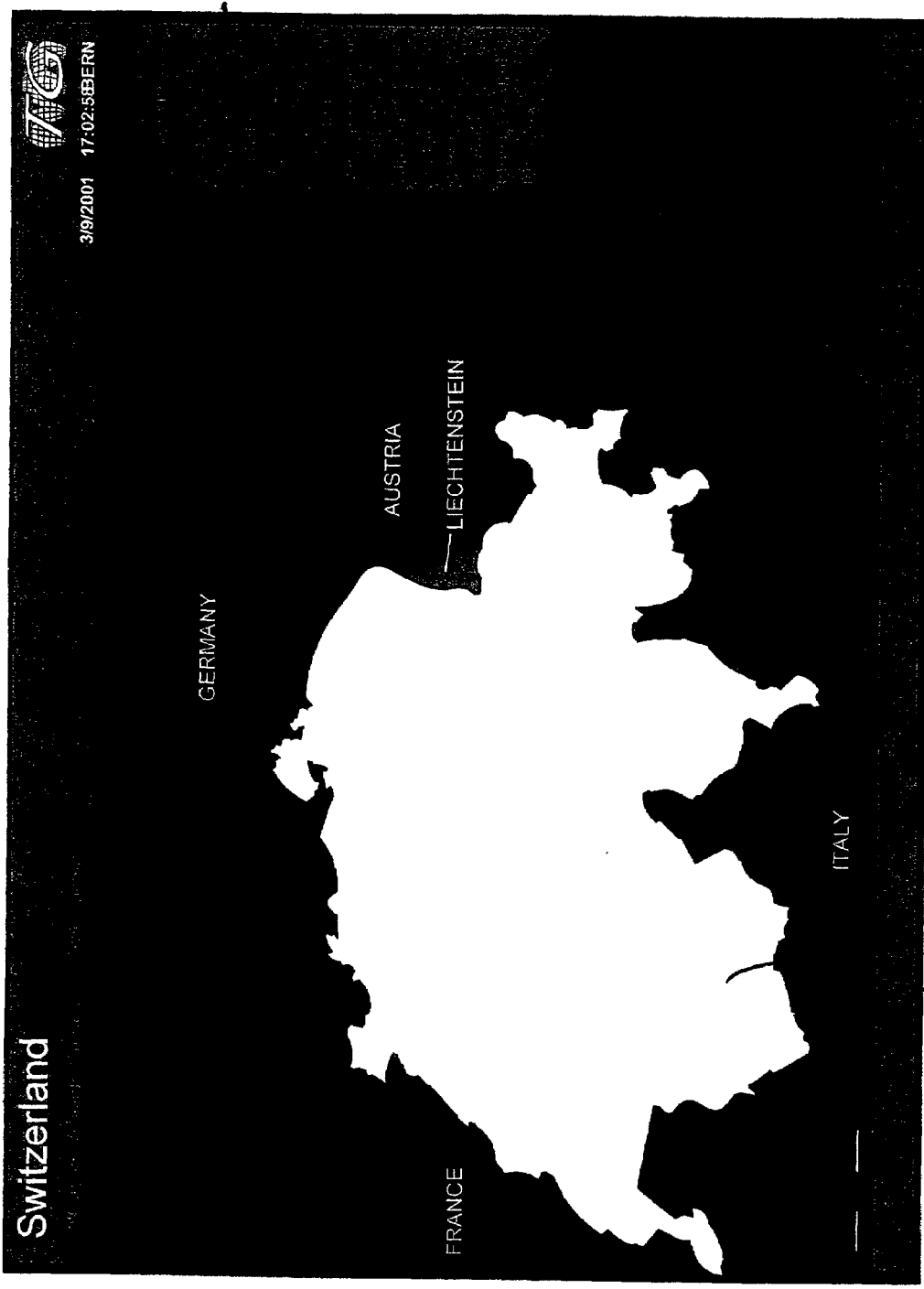
FIGS. 6–8 illustrate the display of different layers of thematic information in accordance with the invention.
Figure 7:
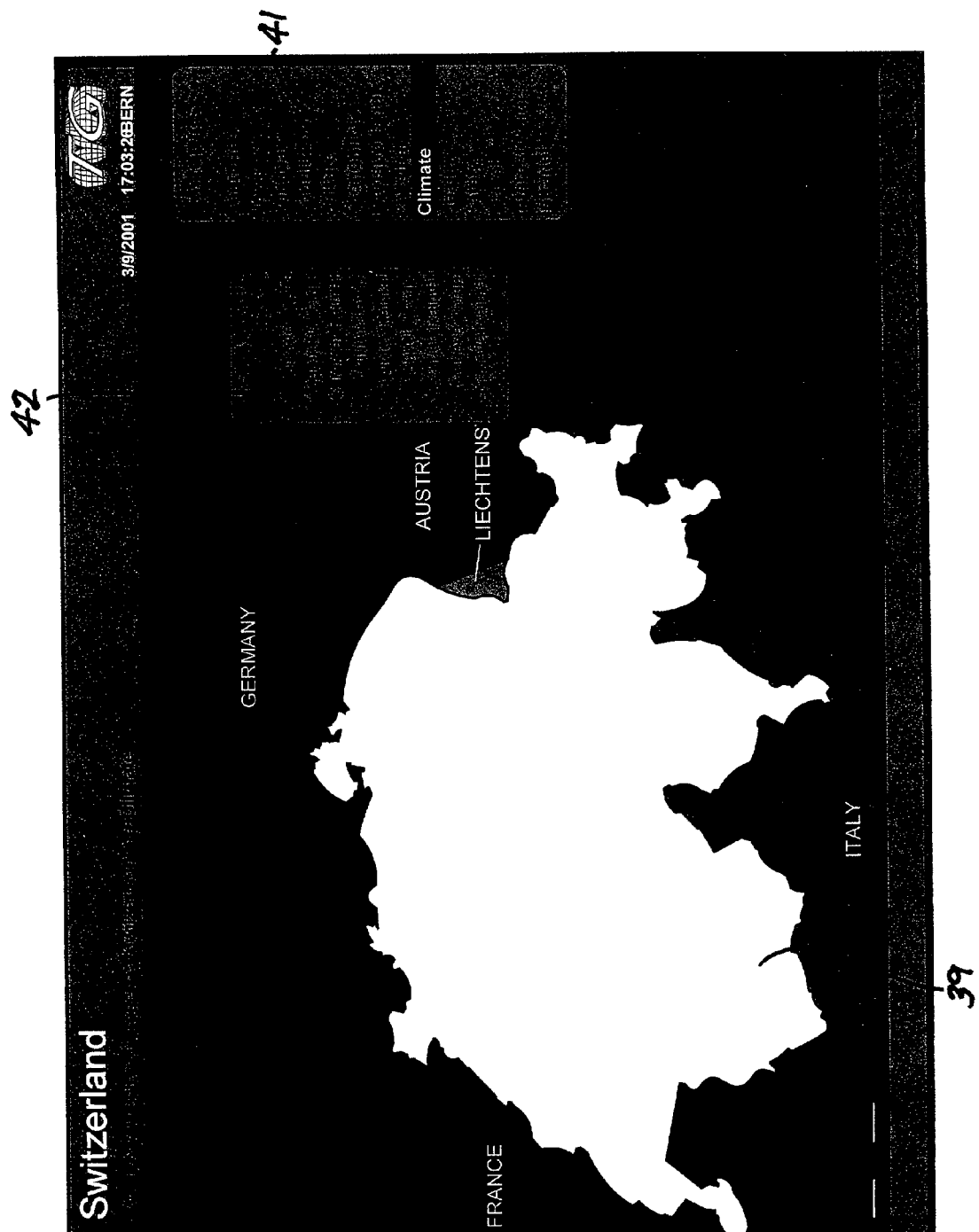
Figure 8:
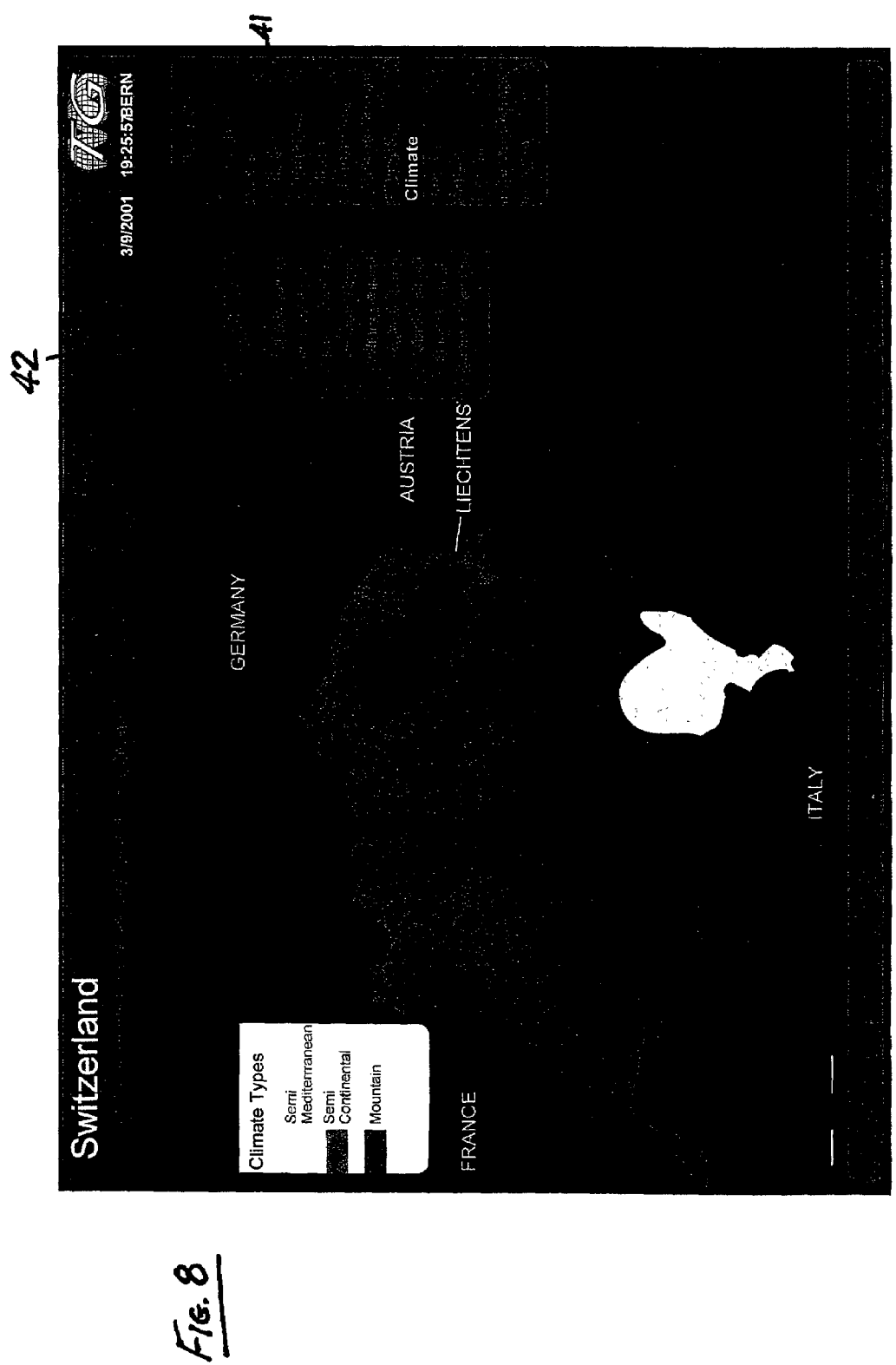

For a given geographic region, several different color-coded map overlays may be used to display information about that region. Thus, for example, FIG. 6 illustrates the main menu overlay for Switzerland. This overlay includes a blank map 39 of Switzerland and the surrounding region, and a menu bar 41 with a list of topics that can be selected. In FIG. 7, "Climate" is been selected on the menu bar, and an overlay with a subtopic menu 42 is added to the display. In FIG. 8, "Climate Types" has been selected on the subtopic menu, and a layer containing a color-coded map 43 showing the climate types in different parts of the country is added to the display.

In order to minimize the amount of data which must be downloaded and, hence, the time required for downloads, the color-coded maps are optimized before being transmitted. Those maps generally include an outline of the country and a number of colored areas, icons, etc. within the outline. The outlines are generally irregular curves or shapes which require a number of points to define them even in the vector format. By sending the outline only once and then combining it at the client with layers containing the other information for the different maps, the amount of data which must be transmitted is significantly reduced.

Figure 9:
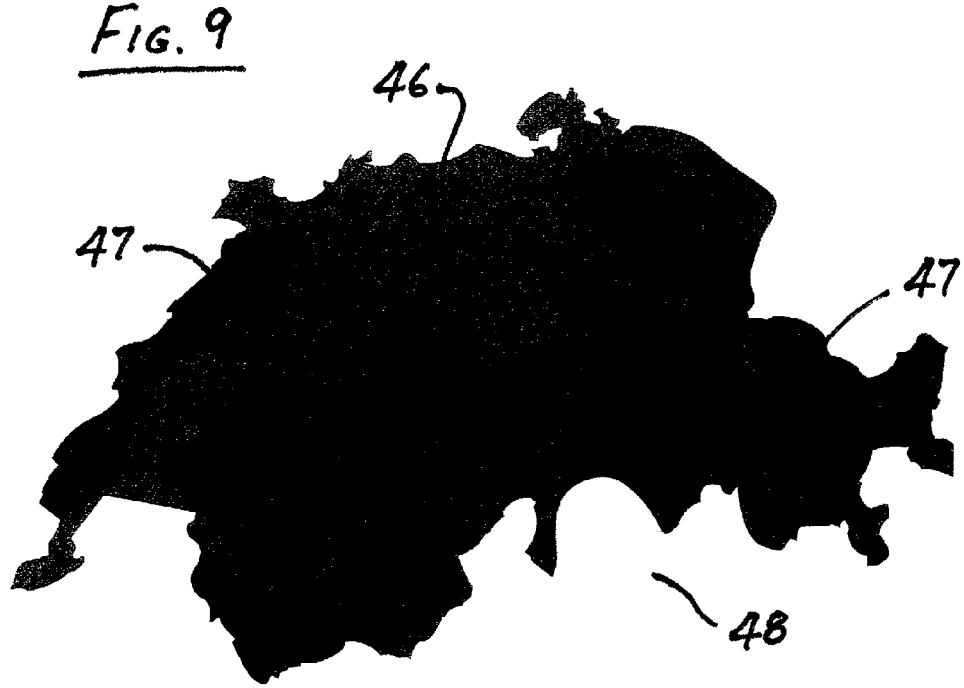
FIGS. 9–15 illustrate the generation of a color-coded map with minimal file size and download time in accordance with the invention.
Figure 10:
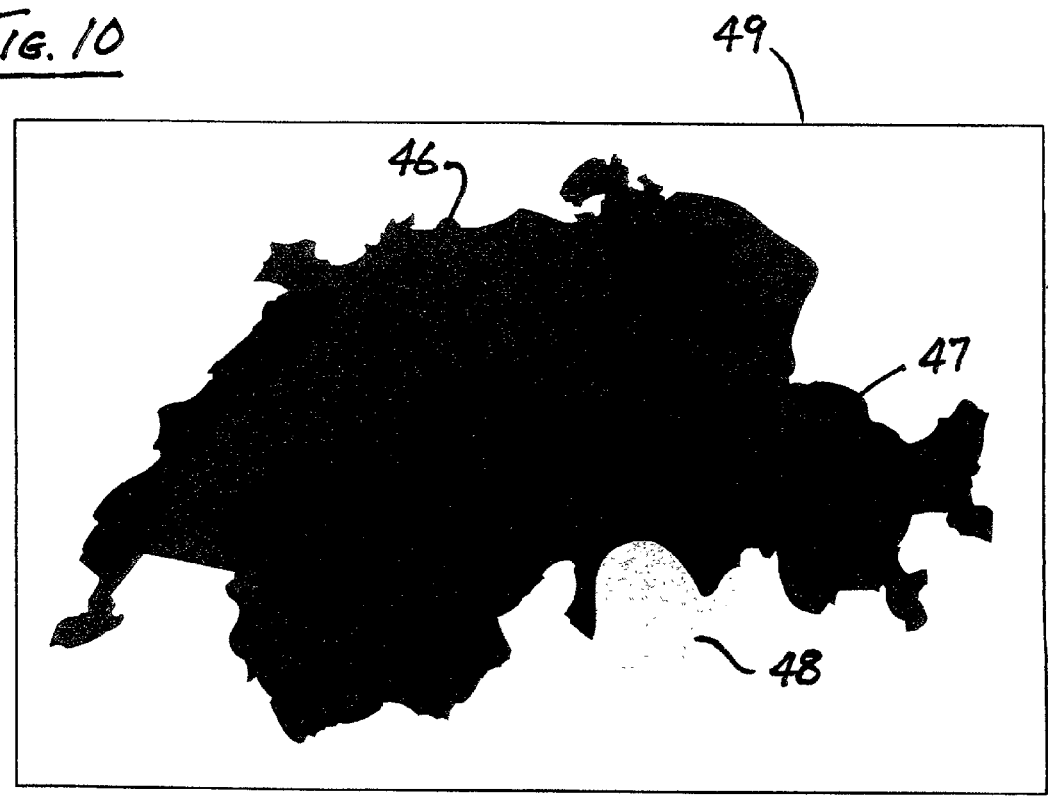
Figure 11:
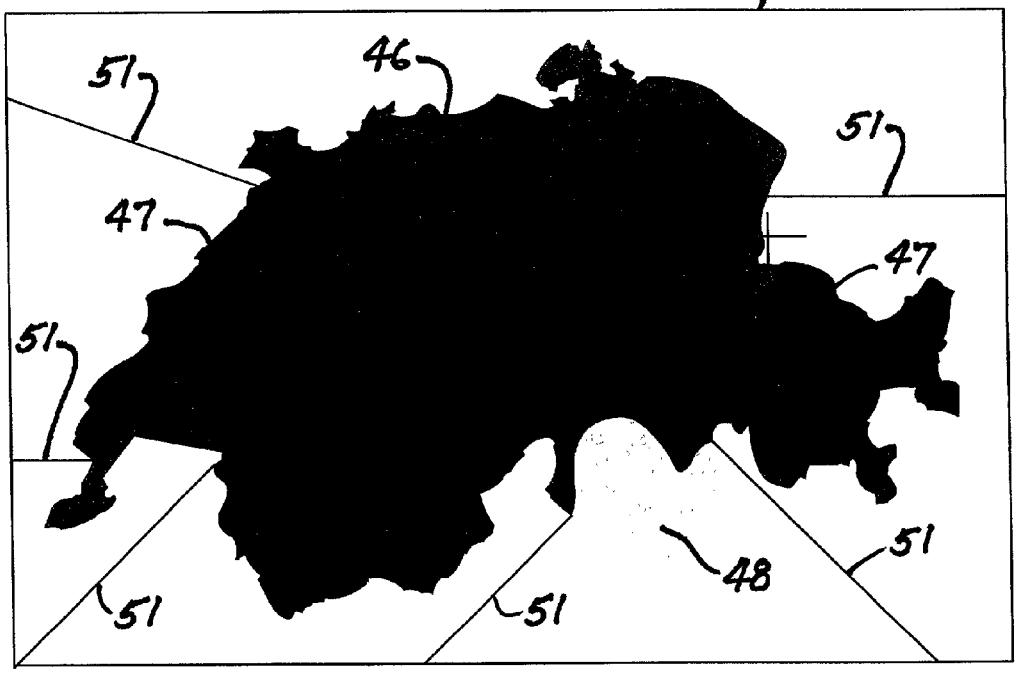

This optimization process is illustrated in FIGS. 9–15 in connection with the Climate Types map of FIG. 8. As illustrated in FIG. 9, this map includes a green area 46, two blue areas 47 and a yellow area 48 within the country outline. A polygon 49 in the form of a rectangle is drawn around the map, as illustrated in FIG. 10, and straight lines 51 are drawn between the color transitions along the outline and the rectangle, as illustrated in FIG. 11. Instead of a rectangle, a polygon having fewer or more sides can be employed, with fewer sides being preferred since that minimizes the number of straight lines and data points which must be downloaded.

Figure 12:
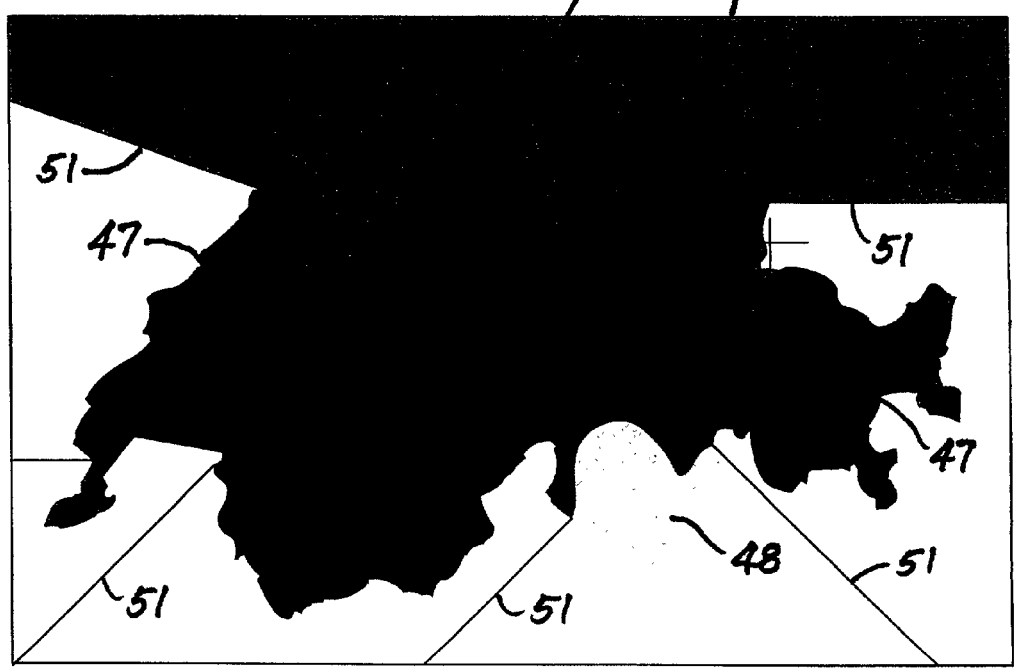
Figure 13:
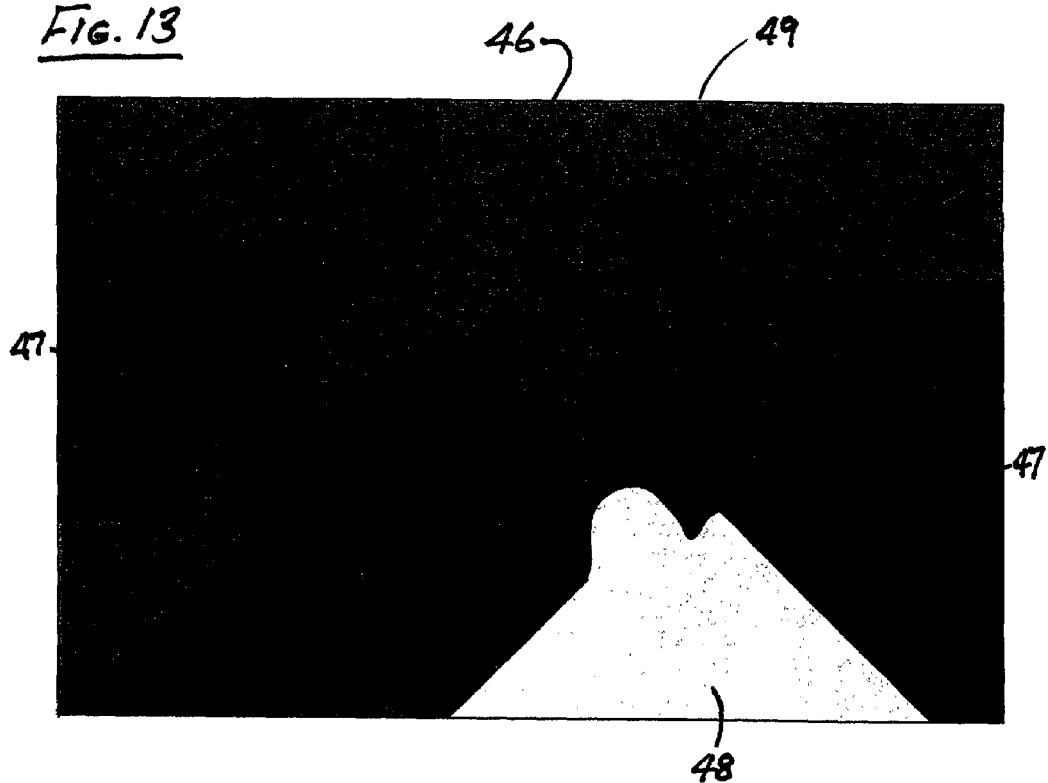
Figure 14:
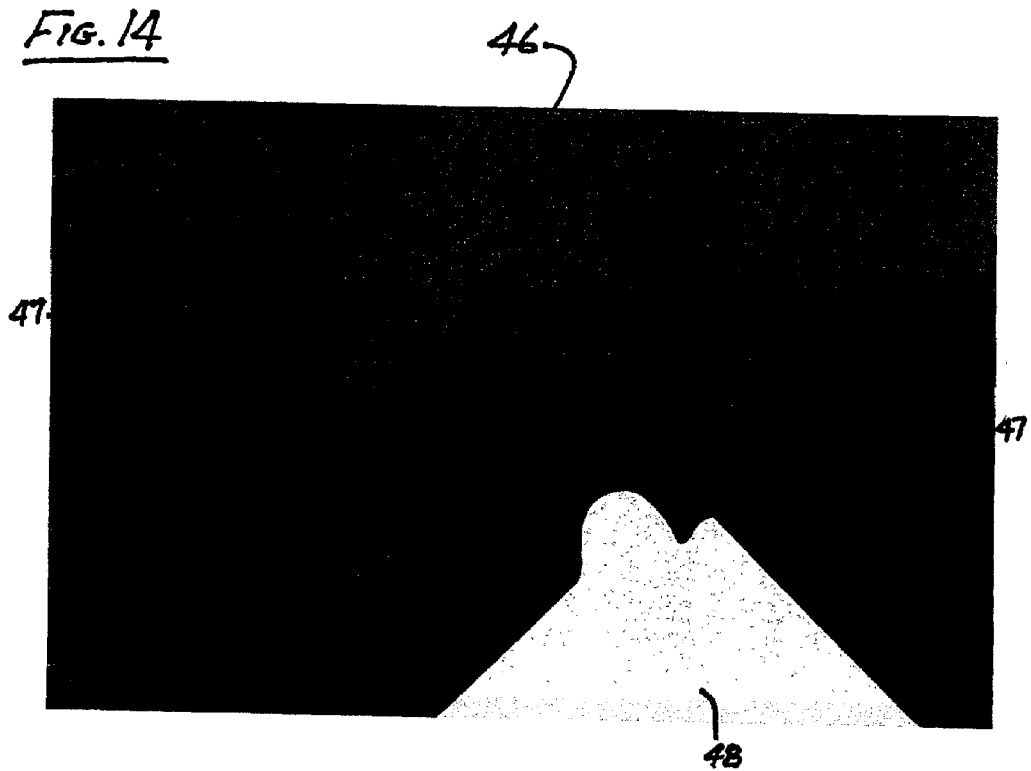

The colored areas are then extended to fill in the areas between the straight lines, thereby eliminating the outline, as illustrated in FIGS. 12 and 13. The rectangle 49 and visible straight lines 51 are then removed, as illustrated in FIG. 14, leaving the vector lines which separate the areas of different color. Thus, the complex outline of the country, which may contain many points, has been replaced with a simple outline consisting of just a few straight lines.

Figure 15:
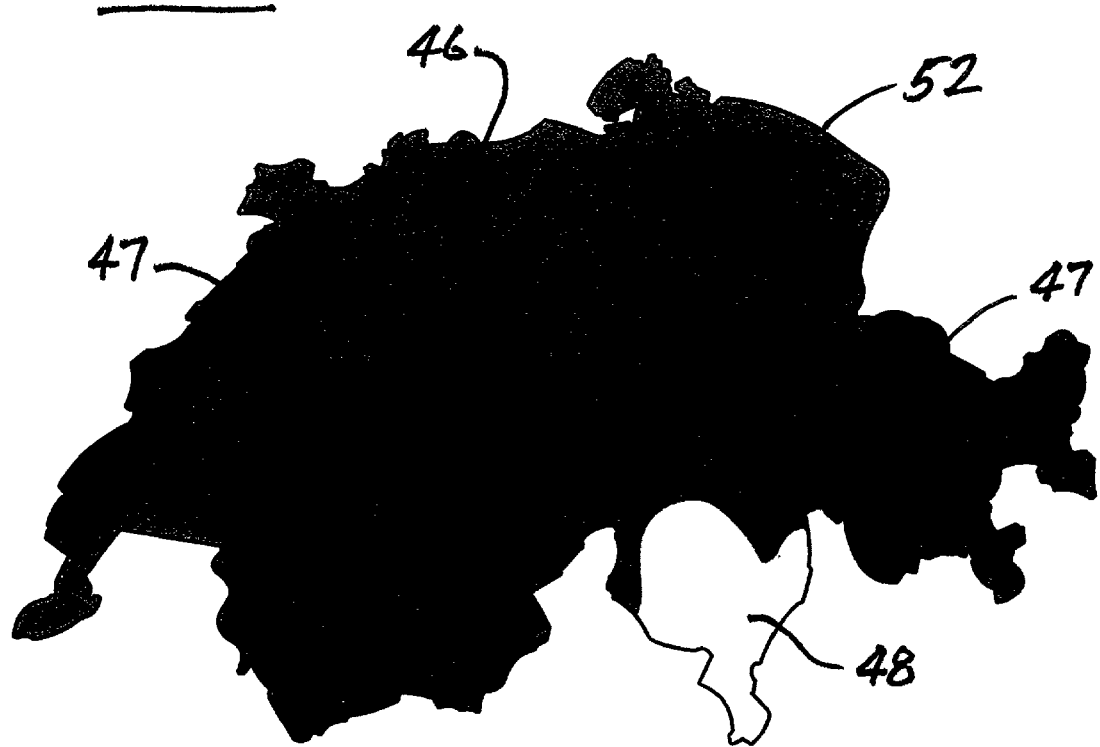

The developer overlays the optimized color-coded map with a layer containing the country outline, with the outline layer acting as a window or mask that displays only the part of the color-coded map that is inside the outline. To show a visible line along the outline, another layer containing the outline is placed beneath the map layer so that the map is displayed as consisting of the outline 52 and the areas 46-48 of different colors within the outline, as illustrated in FIG. 15. As noted above, using the outline layer twice while downloading it only once minimizes the size of the files which must be downloaded and thereby reduces download time. In addition to interchanging the color-coded maps, other theme specific information such as icons can be included in the layers above the masking layer.

Figure 16:
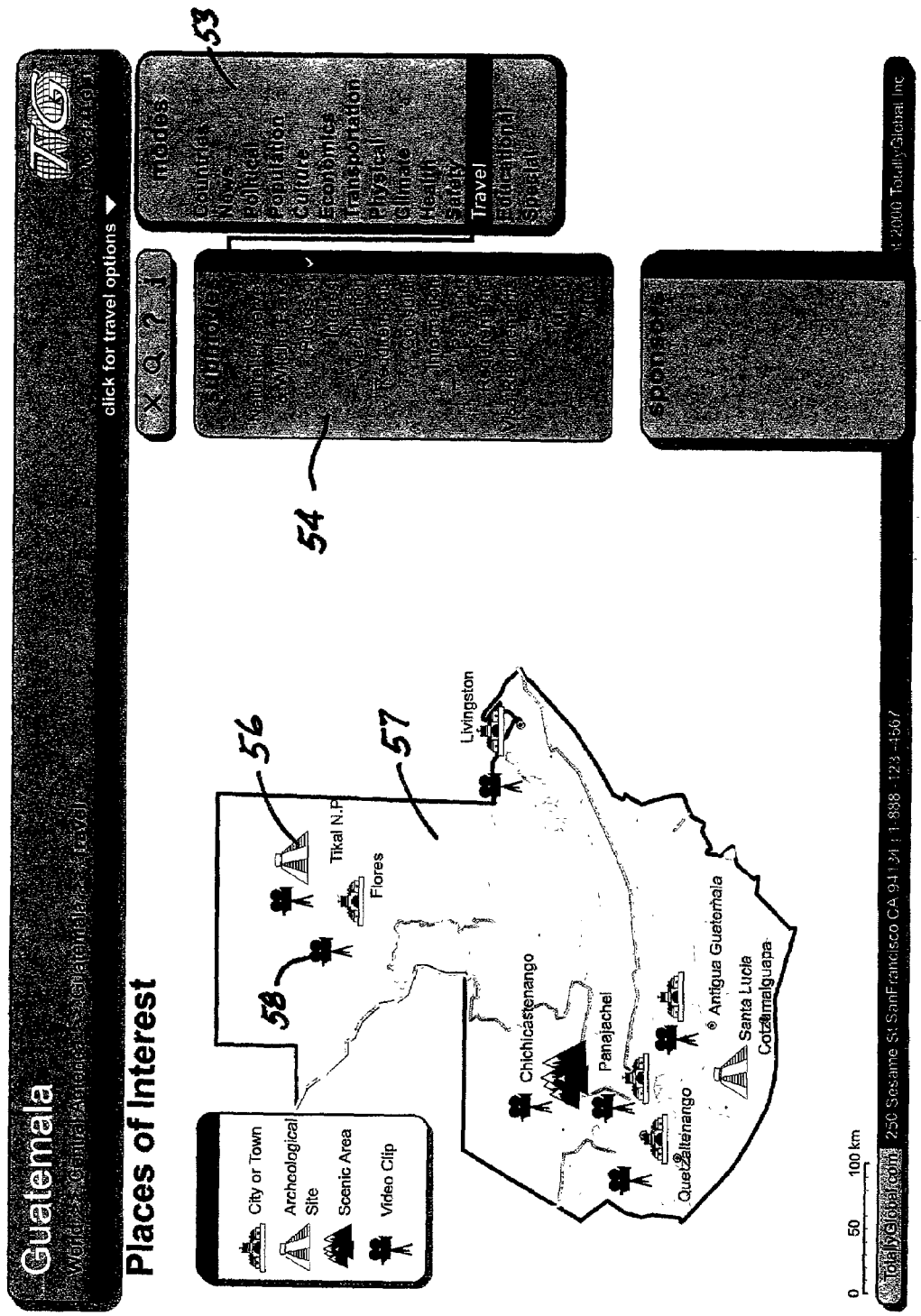

It is also possible to view video clips relating to the geographic region shown on a map. Thus, for example, on the map of Guatemala shown in FIG. 16, "Travel" has been selected from the main menu 53, "Places of Interest" has been selected from the submenu 54, and icons 56 representing different points of interest are displayed on the map 57 along with icons 58 in the form of a movie camera which represent links to locations on the Internet from which a video clip containing information relating to the area can be downloaded. The areas about which the video clips display the information are the areas in which the icons are located on the map. Thus, for example, if the video clip icon near Antigua Guatemala is selected, a video clip relating to Antigua is played. The video clips can be stored at the server 21 or at another location such as server 38. The video clips are, thus, outside the movie which displays the maps, and when the user clicks on a video icon, the client connects to a URL which points to the server where the video clip is located.

The video clip is stored on the server in a digital format, and it is downloaded in a streaming fashion whereby the user can view any portion of the file that has been downloaded, while the rest of the file is being downloaded. This gives the user the appearance of continuous video.

A video clip can also relate to an entire region or country, rather than to a specific point of interest. Thus, in the example of FIG. 17, a weather video icon 59 is displayed on a relief map 61 of Guatemala. This icon represents a link to location where a video clip about the weather for the entire country is located. On this particular map, "Climate" has been selected on the main menu 62, but nothing has been selected on submenu 63.

The invention has a number of important features and advantages. It delivers maps and other types of spatially related thematic information over the Internet in a vector format as the frames of an animation movie, which is inherently faster than downloading images in bitmap form. Download time is reduced even further by optimizing the maps to minimize the amount of data that must be transferred and by interrupting the normal order of downloading to immediately download the data for a frame which has been selected by the client. The result is an almost instantaneous display of the map selected by the user, and going from one map to another is like flipping through the pages of a book.

The information is delivered through an interface that gives users access to it in a way that is natural, intuitive and immediate. The spatial representation of data emulates the way people inherently discover information, and its easy, instantaneous navigation offers a significant improvement over current information systems offered today.

Although the invention has been described primarily with reference to thematic maps, it can be used in a variety of other applications in which spatially related thematic data is required. Such applications might, for example, include the monitoring of airline flights, car rental applications, and dispatch functions such as the servicing of appliances.

It is apparent from the foregoing that a new and improved system and method for transferring thematic information over the Internet have been provided. While only certain presently preferred embodiments have been described in detail, as will be apparent to those familiar with the art, certain changes and modifications can be made without departing from the scope of the invention as defined by the following claims.

The invention is claimed:

1. In a system for transferring thematic information over the Internet between a server and a client:

a source of vector graphics for different themes which includes maps having an outline of a region and areas of different colors within the outline;

means for preparing a color-coded frame by drawing a polygon around one of the maps, drawing a straight line between each color transition along the outline and the polygon, erasing the outline and the straight lines, and filling in the areas between the straight lines with colors from the areas of the map between those lines;

means for preparing a frame containing the outline of the region;

means for displaying the color-coded frame in a layer beneath a layer containing the outline, with the layer containing the outline masking off the colored areas outside the outline so that the map is displayed as comprising the areas of different colors in the shape of the region;

means for importing the vector graphics into the frames of an animation movie;

means for downloading the frames of the movie form the server to the client; and means controlled by the client for selectively overlaying the frames to display different themes.

2. The system of claim 1 further including means for displaying another layer containing the outline with the other layers so that the map is displayed with a visible outline of the region around the areas of different colors.

3. The system of claim 1 including means for preparing a plurality of thematic frames which can be selectively displayed with the layer containing the outline to display different themes for the region.

4. The system of claim 1 wherein the themes include a map of a geographic area with an icon displayed thereon representing a link to a location on the Internet from which a video clip containing information relating to the area can be downloaded, and the system includes means for downloading and playing the video clip upon selection of the icon.

5. The system of claim 1 wherein the means for downloading the frames of the movie includes means for downloading the frames in a predetermined order, means for detecting a request for a frame by the client, and means for altering the order of the download to start downloading one or more frames immediately upon request by the client.

6. In a method of transferring thematic information over the Internet between a server and a client, the steps of:

providing vector graphics for different themes which include maps having an outline of a region and areas of different colors within the outline;

preparing a color-coded frame by drawing a polygon around one of the maps, drawing a straight line between each color transition along the outline and the polygon, erasing the outline and the straight lines, and filling in the areas between the straight lines with the colors from the areas of the map between those lines;

preparing a frame containing the outline of the region;

displaying the color-coded frame in a layer beneath a layer containing the outline, with the layer containing the outline masking off the colored areas outside the outline so that the map is displayed as comprising the areas of different colors in the shape of the region;

importing the vector graphics into the frames of an animation movie;

downloading the frames of the movie from the server to the client; and selectively overlaying the frames to display different themes.

7. The method of claim 6 further including the step of displaying another layer containing the outline with the other layers so that the map is displayed with a visible outline of the region around the areas of different colors.

8. The method of claim 6 including the step of preparing a plurality of thematic frames which can be selectively displayed with the layer containing the outline to display different themes for the region.

9. The method of claim 6 wherein the themes include a map of a geographic area with an icon displayed thereon representing a link to a location on the Internet from which a video clip containing information relating to the area can be downloaded, and the method includes the steps of downloading and playing the video clip upon selection of the icon.

10. The method of claim 6 including the steps of downloading the frames in a predetermined order, detecting a request for a frame by the client, and altering the order of the download to start downloading one or more frames immediately upon request by the client.

11. In a system for transferring thematic information over the Internet between a server and a client:

a source of vector graphics for different themes;

means for importing the vector graphics into an animation movie comprising a menu and a plurality of overlays that can be accessed by selecting topics on the menu;

means for downloading a menu file from the server to the client;

means for downloading data files for the overlays from the server to the client in a predetermined order;

means for interrupting the download if the client selects a topic for which the data file has not yet been downloaded and immediately starting to download the data file for the selected topic; and means for displaying overlays corresponding to topics selected from the menu by the client.

12. The system of claim 11 wherein the means for interrupting the download and immediately starting to download the data file for the selected topic includes means for detecting the selection of a topic, and means for determining whether the data file for the selected topic has already been downloaded.

13. The system of claim 11 wherein the themes include maps comprising an outline of a region and areas of different colors within the outline, and the system includes:

means for preparing a color-coded overlay by drawing a polygon around one the maps, drawing a straight line between each color transition along the outline and the polygon, erasing the outline and the straight lines, and filling in the areas between the straight lines with the colors from the areas of the map between those lines;

means for preparing an overlay containing the outline of the region; and means for displaying the color-coded overlay beneath the overlay containing the outline, with the overlay containing the outline masking off the colored areas outside the outline so that the map is displayed as comprising the areas of different colors in the shape of the region.

14. The system of claim 13 further including means for displaying another layer containing the outline with the overlays so that the map is displayed with a visible outline of the region around the areas of different colors.

15. The system of claim 13 including means for preparing a plurality of color-coded overlays which can be selectively displayed with the overlay containing the outline to display different themes for the region.

16. The system of claim 11 wherein the themes include a map of a geographic area with an icon displayed thereon representing a link to a location on the Internet from which a video clip containing information relating to the area can be downloaded, and the system includes means for downloading and playing the video clip upon selection of the icon.

17. In a method of transferring thematic information over the Internet between a server and a client, the steps of:

providing vector graphics for different themes;

importing the vector graphics into an animation movie comprising a menu and a plurality of overlays that can be accessed by selecting topics on the menu;

downloading a menu file from the server to the client;

downloading data files for the overlays from the server to the client in a predetermined order;

interrupting the download if the client selects a topic for which the data file has not yet been downloaded and immediately downloading the data file for the selected topic; and displaying overlays corresponding to topics selected from the menu by the client.

18. The system of claim 17 including the steps of detecting the selection of a topic, and determining whether the data file for the selected topic has already been downloaded before interrupting the download.

19. The method of claim 17 wherein the themes include maps comprising an outline of a region and areas of different colors within the outline, and the method includes the steps of:

preparing a color-coded overlay by drawing a polygon around one of the maps, drawing a straight line between each color transition along the outline and the polygon, erasing the outline and the straight lines, and filling in the areas between the straight lines with the colors from the areas of the map between those lines;

preparing an overlay containing the outline of the region; and displaying the color-coded overlay beneath the overlay containing the outline, with the overlay containing the outline masking off the colored areas outside the outline so that the map is displayed as comprising the areas of different colors in the shape of the region.

20. The method of claim 19 further including the step of displaying another layer containing the outline with the overlays so that the map is displayed with a visible outline of the region around the areas of different colors.

21. The method of claim 19 including the step of preparing a plurality of color-coded overlays which can be selectively displayed with the layer containing the outline to display different themes for the region.

22. The method of claim 19 wherein the themes include a map of a geographic area with an icon displayed thereon representing a link to a location on the Internet from which a video clip containing information relating to the area can be downloaded, and the method includes the steps of downloading and playing the video clip upon selection of the icon.

23. In a system for transferring thematic maps over the Internet between a server and a client:

a source of thematic maps in a vector format including an outline of a region and areas of different colors within the outline;

means for importing the outline into one frame of an animation movie;

means for preparing a color-coded frame by drawing a polygon around one of the maps, drawing a straight line between each color transition along the outline and the polygon, erasing the outline and the straight lines, and filling in the areas between the straight lines with the colors from the areas of the map between those lines;

means for downloading the outline frame and the color-coded frame from the server to the client; and means for displaying the color-coded frame in a layer beneath a layer containing the outline, with the layer containing the outline masking off the colored areas outside the outline so that the map is displayed as comprising the areas of different colors in the shape of the region.

24. The system of claim 23 further including means for displaying another layer containing the outline with the other layers so that the map is displayed with a visible outline of the region around the areas of different colors.

25. The system of claim 23 including means for preparing a plurality of thematic frames which can be selectively displayed with the layer containing the outline to display different themes for the region.

26. In a method of transferring thematic maps over the Internet between a server and a client, the steps of:

providing thematic maps in a vector format including an outline of a region and areas of different colors within the outline;

importing the outline into one frame of an animation movie;

preparing a color-coded frame by drawing a polygon around one of the maps, drawing a straight line between each color transition along the outline and the polygon, erasing the outline and the straight lines, and filling in the areas between the straight lines with the colors from the areas of the map between those lines;

downloading the outline frame and the color-coded frame from the server to the client; and displaying the color-coded frame in a layer beneath a layer containing the outline, with the layer containing the outline masking off the colored areas outside the outline so that the map is displayed as comprising the areas of different colors in the shape of the region.

27. The method of claim 26 further including the step of displaying another layer containing the outline with the other layers so that the map is displayed with a visible outline of the region around the areas of different colors.

28. The method of claim 26 including the step of preparing a plurality of thematic frames which can be selectively displayed with the layer containing the outline to display different themes for the region.

* * * * *